US007360519B2

(12) United States Patent  
Asfaw et al.

(10) Patent No.: US 7,360,519 B2
(45) Date of Patent: Apr. 22, 2008

(54) ENGINE INTAKE MANIFOLD ASSEMBLY

(75) Inventors: Selamawit Asfaw, Troy, MI (US); James Cederstrom, New Baltimore, MI (US); Christopher Anthony Brewster, Sterling Heights, MI (US); Brian Anthony Krajewski, Ada, MI (US)

(73) Assignee: Dow Global Technologies, Inc., Midland, MI (US)

( * ) Notice: Subject to any disclaimer, the term of this patent is extended or adjusted under 35 U.S.C. 154(b) by 166 days.

(21) Appl. No.: 10/879,981

(22) Filed: Jun. 29, 2004

(65) Prior Publication Data

US 2005/0005890 A1 Jan. 13, 2005

Related U.S. Application Data

(60) Provisional application No. 60/486,038, filed on Jul. 10, 2003.

(51) Int. Cl.
    F02M 35/10 (2006.01)
(52) U.S. Cl. .................................. 123/184.61
(58) Field of Classification Search .......... 123/184.61
    See application file for complete search history.

(56) References Cited

U.S. PATENT DOCUMENTS

| 3,724,599 | A | 4/1973 | Heidacker |
| 3,903,350 | A | 9/1975 | Baird |
| 3,993,126 | A | 11/1976 | Taylor |
| 4,101,003 | A | 7/1978 | Timour et al. |
| 4,266,604 | A | 5/1981 | Sumikawa et al. |
| 4,301,775 | A | 11/1981 | Smart et al. |
| 4,345,552 | A | 8/1982 | Kasting et al. |
| 4,374,717 | A | 2/1983 | Drauglis et al. |
| 4,402,518 | A | 9/1983 | Locacius |
| 4,471,731 | A | 9/1984 | Kasting et al. |
| 4,480,609 | A | 11/1984 | Hayashi |
| 4,492,267 | A | 1/1985 | Cadars |
| 4,495,020 | A | 1/1985 | Nakabayashi et al. |
| 4,498,433 | A | 2/1985 | Ogawa |
| 4,522,165 | A | 6/1985 | Ogawa |

(Continued)

FOREIGN PATENT DOCUMENTS

CA   2355052   7/2000

(Continued)

OTHER PUBLICATIONS

Copending U.S. Appl. No. 09/922,030, filed Aug. 3, 2001.

(Continued)

*Primary Examiner*—Stephen K. Cronin
*Assistant Examiner*—Jason Benton
(74) *Attorney, Agent, or Firm*—Dobrusin & Thennisch PC

(57) ABSTRACT

An engine intake manifold assembly including a first portion configured with a first material and a second portion configured with a second material, wherein the first and second portions are adhesively bonded together. Preferably, the intake manifold assembly is additionally configured with a cylinder head flange, for mounting the same to an automotive engine component, and a throttle body attachment for attachment of a throttle body component. The cylinder head flange and throttle body attachment may be an integral component of the first or second portions or attached to the same during or after assembly of the first and second portions. Optionally, an insert is located between the assembled first and second portion to create one or more plenums thereby creating one or more air flow paths through the intake manifold assembly.

48 Claims, 3 Drawing Sheets

U.S. PATENT DOCUMENTS

| | | | |
|---|---|---|---|
| 4,531,578 A | 7/1985 | Stay et al. | |
| 4,540,044 A | 9/1985 | Lenz | |
| 4,576,223 A | 3/1986 | Humpolik et al. | |
| 4,586,566 A | 5/1986 | Kern et al. | |
| 4,600,051 A | 7/1986 | Wehrman | |
| 4,608,950 A | 9/1986 | Payne et al. | |
| 4,677,947 A | 7/1987 | Bousquet | |
| 4,678,026 A | 7/1987 | Lenz et al. | |
| 4,682,672 A | 7/1987 | Berger et al. | |
| 4,709,670 A | 12/1987 | Ampferer | |
| 4,709,689 A | 12/1987 | Simcox | |
| 4,709,757 A | 12/1987 | Bly | |
| 4,735,261 A | 4/1988 | Huebner | |
| 4,898,261 A | 2/1990 | Winberg et al. | |
| 4,930,469 A | 6/1990 | Kamprath et al. | |
| 4,938,314 A | 7/1990 | Sitzier et al. | |
| 4,939,923 A | 7/1990 | Sharp | |
| 4,940,086 A | 7/1990 | Stay | |
| 4,941,936 A | 7/1990 | Wilkinson et al. | |
| 4,951,783 A | 8/1990 | Kamprath et al. | |
| 4,961,967 A | 10/1990 | Pluddemann | |
| 4,985,523 A | 1/1991 | Mochizuki et al. | |
| 5,058,542 A | 10/1991 | Grayson et al. | |
| 5,083,537 A | 1/1992 | Onofrio et al. | |
| 5,098,743 A | 3/1992 | Juday | |
| 5,106,928 A | 4/1992 | Skoultchi et al. | |
| 5,107,924 A | 4/1992 | Herbert et al. | |
| 5,158,045 A | 10/1992 | Arthur et al. | |
| 5,188,078 A | 2/1993 | Tamaki | |
| 5,195,581 A | 3/1993 | Puntambekar et al. | |
| 5,223,684 A | 6/1993 | Li et al. | |
| 5,250,629 A | 10/1993 | Tani et al. | |
| 5,273,010 A | 12/1993 | Elder | |
| 5,284,203 A | 2/1994 | Dauvergne | |
| 5,285,754 A | 2/1994 | Bell | |
| 5,298,587 A | 3/1994 | Hu et al. | |
| 5,320,875 A | 6/1994 | Hu et al. | |
| 5,323,740 A | 6/1994 | Daily et al. | |
| 5,323,745 A | 6/1994 | Sato et al. | |
| 5,329,903 A | 7/1994 | Mueller et al. | |
| 5,364,914 A | 11/1994 | Choate et al. | |
| 5,365,901 A | 11/1994 | Kiczek | |
| 5,375,569 A | 12/1994 | Santella | |
| 5,376,428 A | 12/1994 | Palazzotto et al. | |
| 5,412,024 A | 5/1995 | Okada et al. | |
| 5,433,786 A | 7/1995 | Hu et al. | |
| 5,492,086 A | 2/1996 | Kuhns | |
| 5,494,712 A | 2/1996 | Hu et al. | |
| 5,511,518 A | 4/1996 | Jain et al. | |
| 5,531,196 A | 7/1996 | Clark | |
| 5,539,070 A | 7/1996 | Zharov et al. | |
| 5,569,734 A | 10/1996 | Petschel et al. | |
| 5,575,256 A | 11/1996 | Peters et al. | |
| 5,617,825 A | 4/1997 | Altmann et al. | |
| 5,630,387 A | 5/1997 | Kamiyama | |
| 5,636,605 A | 6/1997 | Nomizo et al. | |
| 5,636,607 A | 6/1997 | Sattler et al. | |
| 5,636,759 A | 6/1997 | Brummer | |
| 5,642,697 A | 7/1997 | Jahrens et al. | |
| 5,663,284 A | 9/1997 | Kominami et al. | |
| 5,669,350 A | 9/1997 | Altmann et al. | |
| 5,686,544 A | 11/1997 | Pocius | |
| 5,704,325 A | 1/1998 | Sattler et al. | |
| 5,704,335 A | 1/1998 | Akutagawa et al. | |
| 5,715,782 A | 2/1998 | Elder | |
| 5,717,009 A | 2/1998 | Matsushita et al. | |
| 5,743,011 A | 4/1998 | Dickerson et al. | |
| 5,746,168 A | 5/1998 | Lochbrunner et al. | |
| 5,746,177 A | 5/1998 | Criss et al. | |
| 5,791,312 A | 8/1998 | Sattler et al. | |
| 5,794,591 A | 8/1998 | Kalebjian et al. | |
| 5,797,589 A | 8/1998 | Kalabjian et al. | |
| 5,837,958 A | 11/1998 | Fornsel | |
| 5,865,244 A | 2/1999 | Moser | |
| 5,875,758 A | 3/1999 | Fujita | |
| 5,877,236 A | 3/1999 | Roesch et al. | |
| 5,878,715 A | 3/1999 | Hernandez et al. | |
| 5,883,192 A | 3/1999 | Natori et al. | |
| 5,883,208 A | 3/1999 | Deviny | |
| 5,947,073 A | 9/1999 | Chaffin et al. | |
| 5,957,100 A | 9/1999 | Frohwerk et al. | |
| 6,013,709 A | 1/2000 | Masuyama et al. | |
| 6,021,753 A * | 2/2000 | Chaffin et al. | 123/184.61 |
| 6,131,543 A | 10/2000 | Achenbach et al. | |
| 6,161,513 A | 12/2000 | Lohr et al. | |
| 6,167,855 B1 | 1/2001 | Mammarella et al. | |
| 6,199,530 B1 * | 3/2001 | Brassell et al. | 123/184.34 |
| 6,267,093 B1 * | 7/2001 | Lohr | 123/184.61 |
| 6,302,074 B1 | 10/2001 | Bolsover et al. | |
| 6,318,752 B1 | 11/2001 | Warnecke et al. | |
| 6,446,591 B1 * | 9/2002 | Chae et al. | 123/184.61 |
| 6,491,346 B1 | 12/2002 | Gupta et al. | |
| 6,497,413 B1 | 12/2002 | Schmatz | |
| 6,543,404 B2 | 4/2003 | Jones et al. | |
| 6,550,440 B1 * | 4/2003 | Vrsek et al. | 123/184.61 |
| 6,739,301 B2 * | 5/2004 | Brassell et al. | 123/184.61 |
| 6,739,302 B2 | 5/2004 | Jones et al. | |
| 6,857,409 B2 * | 2/2005 | Ito et al. | 123/184.42 |
| 2002/0046725 A1 | 4/2002 | Ogata | |
| 2002/0058764 A1 | 5/2002 | Sonnenschein et al. | |
| 2002/0112684 A1 | 8/2002 | Jones et al. | |
| 2002/0144668 A1 * | 10/2002 | Schermuly et al. | 123/184.42 |
| 2002/0144808 A1 | 10/2002 | Jones | |
| 2003/0001410 A1 | 1/2003 | Cate et al. | |
| 2003/0024768 A1 | 2/2003 | Jones | |
| 2003/0079707 A1 | 5/2003 | Brassell et al. | |
| 2003/0221651 A1 * | 12/2003 | Ito et al. | 123/184.61 |
| 2004/0200450 A1 * | 10/2004 | Tanikawa et al. | 123/184.42 |
| 2006/0016416 A1 * | 1/2006 | Kim et al. | 123/184.61 |
| 2006/0037575 A1 * | 2/2006 | Enokida et al. | 123/184.42 |

FOREIGN PATENT DOCUMENTS

| | | |
|---|---|---|
| DE | 3720483 A1 | 1/1988 |
| DE | 3809944 A1 | 10/1989 |
| DE | 3927955 A1 | 2/1991 |
| DE | 41 03 685 | 8/1992 |
| DE | 44 03 219 A1 | 8/1995 |
| DE | 19735 445 A | 1/1999 |
| DE | 199 02817 A | 7/2000 |
| EP | 0512678 | 11/1992 |
| EP | 0823455 A | 2/1998 |
| EP | 0872632 A | 10/1998 |
| EP | 0992674 A2 | 12/2000 |
| EP | 1 156 206 A2 | 11/2001 |
| EP | 1 316 715 A2 | 6/2003 |
| FR | 2 494 343 | 5/1982 |
| GB | 1045948 | 10/1966 |
| GB | 2 245 931 A | 1/1992 |
| JP | 362003155 A | 1/1987 |
| JP | 407027016 A | 1/1995 |
| JP | 8-132529 | 5/1996 |
| JP | 08132529 A | 5/1996 |
| JP | 11207826 | 3/1999 |
| JP | 11207826 A | 8/1999 |
| JP | 11-302480 | 11/1999 |
| JP | 2000210947 | 2/2000 |
| JP | 2000210947 A | 8/2000 |
| WO | WO 99 14273 A | 3/1999 |
| WO | WO 99/52703 | 10/1999 |
| WO | WO 00/43644 | 7/2000 |
| WO | WO 01/44331 A1 | 6/2001 |
| WO | WO 02/059197 A2 | 8/2002 |

WO  WO 2004/000511 A2  12/2003

OTHER PUBLICATIONS

Copending U.S. Appl. No. 09/466,321, filed Dec. 17, 1999.
Derwent AN 1980-F449C, Nissan Motor Co., Ltd. Great Britain 2037887A and B.
Patent Abstracts of Japan, vol. 11, No. 388 (M-652), Dec. 18, 1987 and JP 62 157267A (Tsuchiya Mfg. Co., Ltd.), Jul. 13, 1987 abstract.
Patent Abstracts of Japan, vol. 11, No. 057 (M-564), Feb. 21, 1987 & JP 61 218754A (Toyoda Gosal Co. Ltd.), Sep. 29, 1986 abstract.
Bauer, Manfred and Frank Warnecke, "Development of an all-plastics instrument panel for the new Opel Corsa", presented at the VDI-K show Apr. 4-5, 2001, pp. 59-70.
Communication Relating to the Results of the Partial International Search for International Application No. PCT/US2004/021174.

* cited by examiner

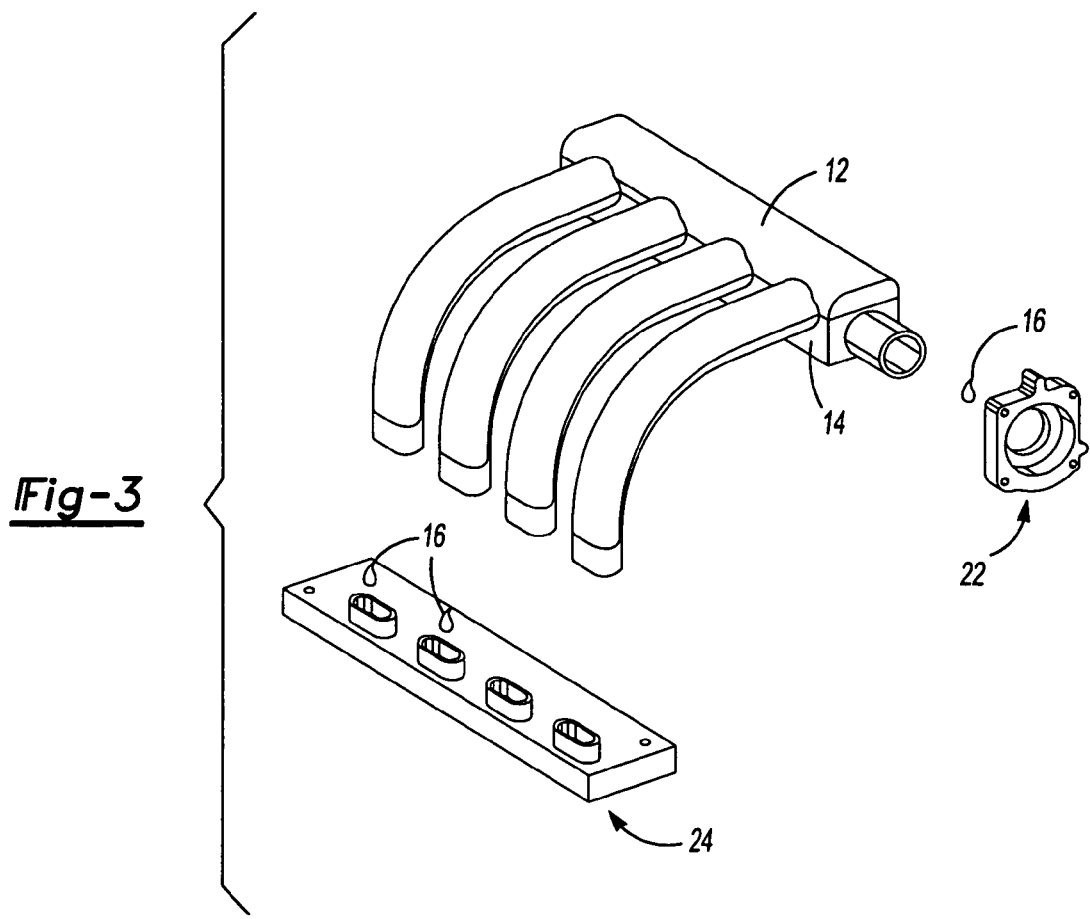
*Fig-3*
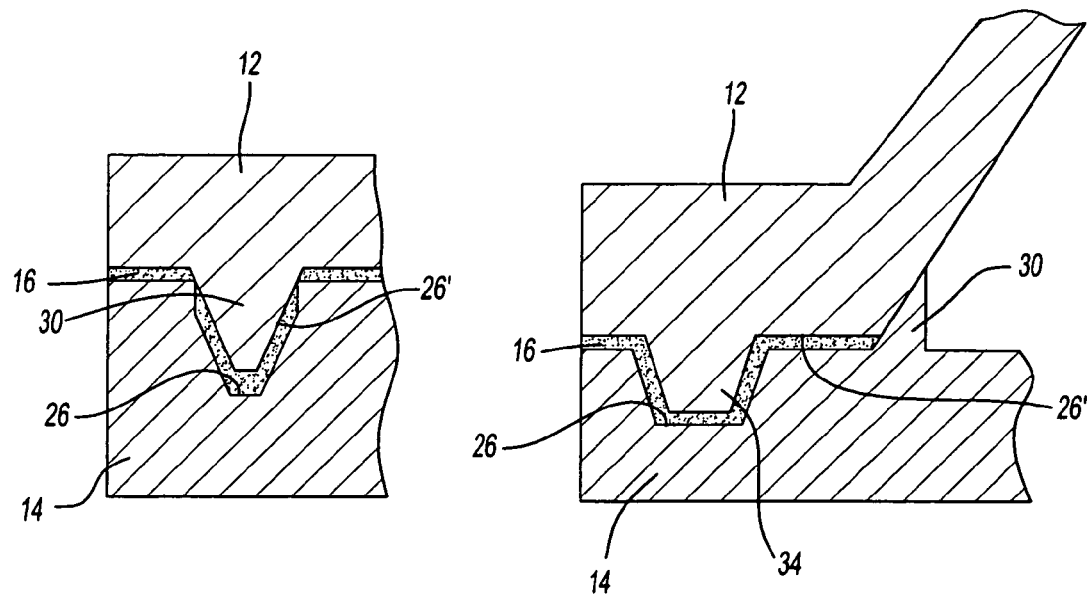
*Fig-4A*  *Fig-4B*

ENGINE INTAKE MANIFOLD ASSEMBLY

CLAIM OF BENEFIT OF FILING DATE

The present application claims the benefit of the filing date of U.S. Provisional Application Ser. No. 60/486,038, filed Jul. 10, 2003, hereby incorporated by reference.

TECHNICAL FIELD

The present invention relates to adhesively bonded engine component assemblies and more particularly to adhesively bonded intake manifold assemblies.

BACKGROUND OF THE INVENTION

Historically, fabrication techniques have involved the fabrication of separate metal components and joining the components using fasteners, with an intermediate disposed gasket. This tends to require many parts and therefore is labor intensive.

Plastic engine intake manifold assemblies (such as for automotive vehicle engines) have been fabricated by near net shape manufacturing processes, such as lost core processes. While these tend to result in desirable near net shape products, the shapes of which may be complex, they typically are expensive.

In another popular process, two or more plastic intake manifold components are made, each with a planar mating surface. The components are joined at each of their respective mating surfaces by vibration welding. Such joining, however, can limit the design flexibility of components. For example, there is a potential that any warpage of respective components or other surface irregularities will result in undesirable gaps at the mating surface upon welding. Thus, it is imperative that opposing mating surfaces are planar, which, in turn, constrains design flexibility.

U.S. Pat. No. 6,267,093 discloses an example of the use of an adhesive to bond intake manifold components. The structure shown appears to require the presence of a particular scarf joint.

U.S. Pat. No. 6,543,404 discloses one improved approach to the manufacture of an intake manifold assembly, pursuant to which components of an engine intake manifold assembly are joined together with an adhesive bond. Various of the inventions of this patent have made possible a number of additional improvements to the manufacture of automotive intake manifold assemblies.

SUMMARY OF THE INVENTION

The present invention illustrates such improvements particularly in the area of assembling intricately shaped intake manifold assemblies from components of the same materials, or more preferably from components having dissimilar materials. Thus, in one preferred aspect the present invention contemplates a method for making an intake manifold for an automotive vehicle, comprising the steps of providing a first shell portion of an intake manifold being made of a first material; and adhesively joining the first shell portion to a second shell portion of the intake manifold being made of a second material that is different from the first material, wherein the first shell portion and the second shell portion combine to form runners for air flow within the intake manifold.

In another preferred aspect, there is contemplated a method for making an automotive vehicle intake manifold, comprising the steps of providing a first manifold portion; providing a second manifold portion; placing a manifold insert between the first manifold portion and the second manifold portion; and adhesively joining the first manifold portion to the second manifold portion with the insert therebetween to define an intake manifold for an automotive vehicle.

In still another preferred aspect, there is contemplated a method for making an automotive vehicle intake manifold comprising the steps of providing a first portion of an intake manifold for defining an air path, the first portion being free of at least one of a throttle body connector or a cylinder head flange; joining the first portion to a throttle body assembly; and joining the first portion to an engine cylinder head.

In yet another preferred aspect, there is contemplated the employment of a particular joint structure, which includes an alignment feature integrally formed with a first or second manifold portion, and being configured to align and maintain a gapped relationship between first and second mating surfaces to form an intake manifold assembly.

Combinations of the above aspects are also contemplated, as are the articles that are made according to the methods, or which are made by other methods but incorporate the same resulting structures.

BRIEF DESCRIPTION OF THE DRAWINGS

FIG. 3 is an exploded perspective view of another aspect of the present invention.

FIGS. 4A-4D are sectional views of possible illustrative alignment features of the present invention.

DETAILED DESCRIPTION OF THE PREFERRED EMBODIMENT

Figure 1:
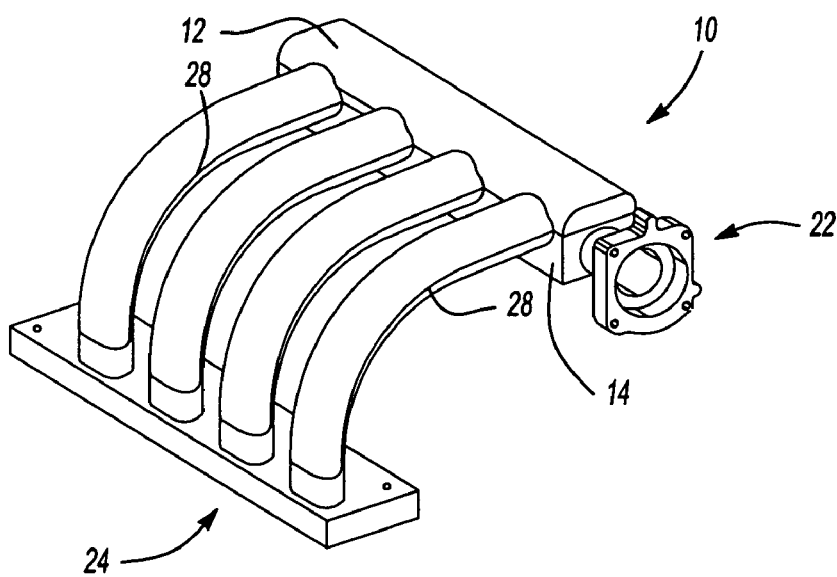
FIG. 1 is a perspective view of an intake manifold assembly in accordance with the present invention.
Figure 2:
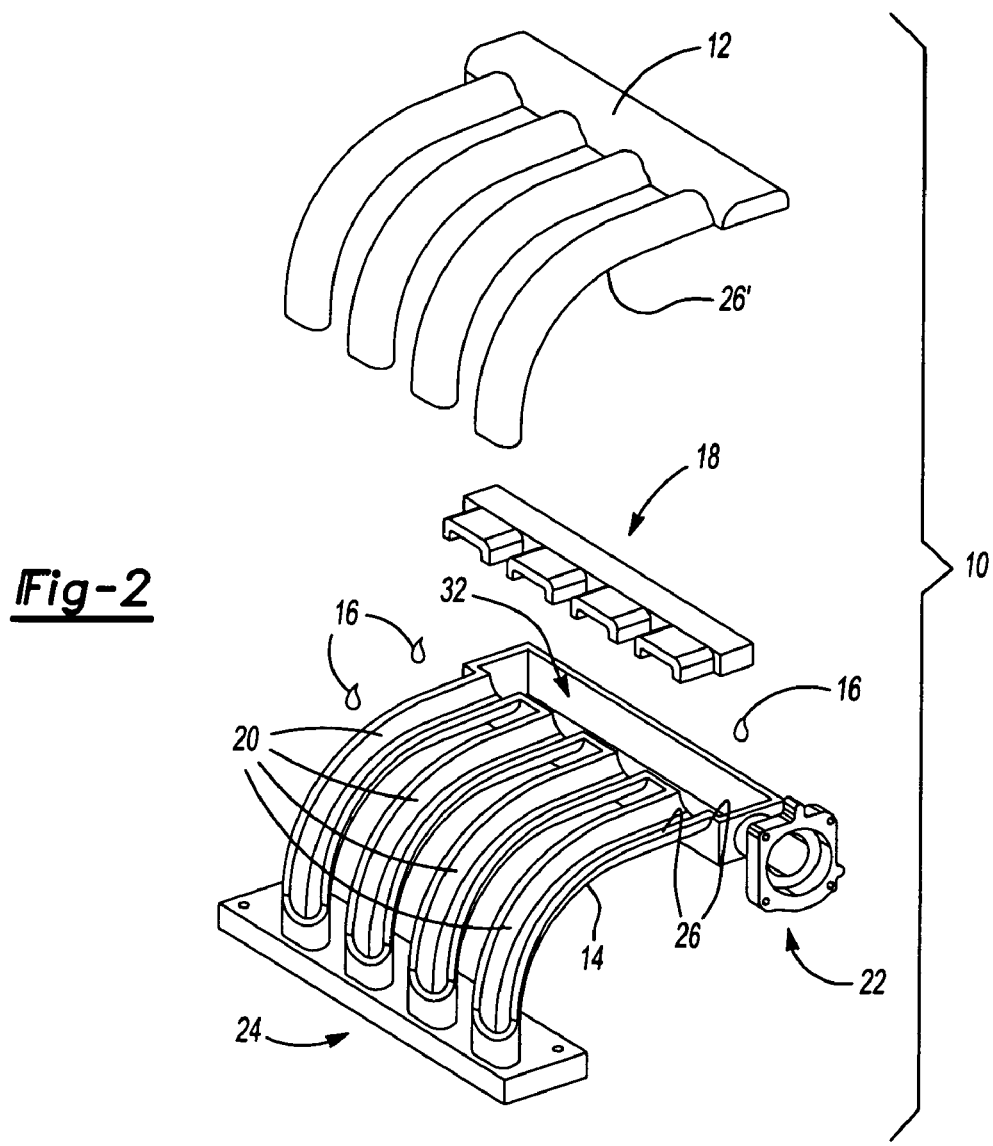
FIG. 2 is an exploded perspective view of FIG. 1.

Referring to FIGS. 1-3, there is shown an intake manifold assembly 10 of the present invention including a first portion 12 and a second portion 14. The first portion 12 and the second portion 14 are joined together, preferably with an intermediate adhesive 16 to form the intake manifold. In a preferred embodiment the joining of the first and second manifold portion forms one or more runners for defining an airflow space.

Either or both of the first or second portions can include one or more additional coatings, layers or components (e.g., a primer, a plasma coating or other surface treatment). Other surface treatments such as sanding, scuffing, corona treatment, laser treatment, flame treatment, combinations thereof or the like may be performed upon the portions. Optionally, either or both of the first portion 12 or second portion 14 has structure for facilitating joinder or location of the portions relative to each other, to an engine head, or to another engine component. As discussed in U.S. Pat. No. 6,543,404 (incorporated by reference), for example, with reference to FIGS. 2 and 3a-3c of that patent, various structural features may be incorporated into one or more of the present portions in order to enhance joinder of the portions to each other. For example, in addition to any optional mechanical fastener, any suitable coacting structure for defining a joint may be employed, such as a friction fit, an interference fit or some other interlock fit, may be used. Examples of suitable joints include butt joints, lap joints, tongue in groove joints, scarf joints, combinations thereof, or the like.

As also discussed in U.S. Pat. No. 6,543,404 (incorporated by reference), a suitable snap fit connection may be employed for joining the first and second portions, for providing a locator, such as an audible locator, or for otherwise facilitating assembly. Alternatively, or in addition, one or more of the portions may include a flange having an inner wall surface for increasing the surface area available for bonding and for engaging the other component.

Turning to the embodiments illustrated in FIGS. 1-3, there are shown a variety of configurations and design alternatives that may be used in accordance with the present invention. It should be recognized that combinations of the features shown in one embodiment with features shown in another embodiment are within the scope of the present invention, even if a drawing omits illustration of such a feature. For example, a mechanical attachment (e.g., a fastener, a snap-fit, or combination thereof) may be employed in an embodiment, even if not shown. Likewise, a joint might be illustrated as a tongue in groove joint, but other joint types may be employed or omitted altogether, such as a lap joint, a butt joint, a scarf joint, a combination thereof or the like. Further, the embodiments of FIGS. 1-3 might employ an alignment feature, such as (without limitation) depicted in one or a combination of the embodiments FIGS. 4A-4D.

In one preferred embodiment, the intake manifold assembly 10 includes the same or different materials in two or more different manifold portions. For instance, it may include a first manifold portion 12 (e.g., an upper shell) made of a first material and a second manifold portion 14 (e.g., a lower shell) made of a second material that is the same or different from the first material, wherein the first portion and the second portion are joined together with an adhesive and an optional mechanical attachment. An even more preferred approach is to also include a manifold insert 18 (which may be the same or different material relative to either or both of the first or second materials) within the space defined between the first and second manifold portions 12, 14 (e.g., the insert option may subdivide such space into a plenum configuration have one plenum or more than one plenum). Thus, a preferred method contemplates providing a first manifold portion 12 (e.g., a first runner portion) made of a first material; providing a second manifold portion 14 (e.g., a second runner portion) made of a second material; placing a manifold insert 18 between the first manifold portion and the second manifold portion; and adhesively joining the first manifold portion 12 to the second manifold portion 14 with the insert therebetween to define the intake manifold assembly 10. The manifold insert 18 will preferably matingly engage one or more of the manifold portions 12, 14. The manifold insert 18 optionally may also be otherwise mechanically attached, adhesively attached or both (according to the joining teaching herein) to one or more manifold portions 12, 14.

In yet another embodiment, which may be employed by itself or with the plural manifold portion embodiment just discussed, a structure of the intake manifold assembly 10 is employed that includes a portion that defines a manifold air path for the manifold, but is free of either or both of a throttle body attachment 22, a cylinder head flange 24 or both. Under this approach, an assembly is made by providing such manifold portion of an intake manifold for defining an air path, joining the first manifold portion to a throttle body assembly, and joining the first manifold portion to the engine cylinder head or otherwise. The above referenced insert 18 may be employed in this embodiment also.

Referring again to the FIGS. 1-3, in one particularly preferred embodiment, the present invention contemplates an intake manifold assembly 10 comprising an upper first manifold portion 12 of a first material and a lower second manifold portion 14 of a second material that preferably (though not necessarily) is different from the first material, which, when combined together, forms one or more intake manifold paths 20 for directing the flow of a fluid (e.g., air, an air fuel mixture or otherwise) to the engine. Optionally, other components may also be integrated with or separately fabricated therefrom and added to the intake manifold assembly 10 and may be directly attached to or integrally formed with the manifold assembly or may be attached using flanges, intermediate attachments or the like. Examples of such components include one or more throttle body attachments 22, cylinder head flange 24, EGR valve attachments, cross-over (water) pipe attachment, housing for active manifold actuators, blow-by valve attachment, attachment for one or more valve cover, brackets (e.g., hoses, cables or otherwise), nipples (e.g. HVAC or otherwise), fuel rails, a throttle body, an air cleaner, a water cross over, an EGR valve, a valve cover, a sensor, combinations thereof or otherwise. Preferably, the assembly of any of the above components is facilitated through bonding and more preferably through adhesive bonding. In this manner the ability to optimize material selection (e.g. by the use of dissimilar materials) based upon function and collation in the intake manifold assembly 10 can be further optimized.

As discussed above, the present invention contemplates the use of different materials throughout an intake manifold assembly 10, which are especially designed to withstand the given operating conditions. For example, given the increased operating temperature that occurs localized to the engine block or throttle body, the throttle body attachment 22, cylinder head flange 24, another component (as previously discussed) or combinations of them, may comprise a material that is more resistant to high temperatures, exhibits thermal stability, meets relatively high stress loading requirements, combinations thereof or the like. Likewise, materials that are not resistant to high temperature may be used in other components of the intake manifold, such as those that do not encounter such high temperatures.

Referring again to FIGS. 1-2, the intake manifold assembly 10 is configured with the first manifold portion 12, the second manifold portion 14 and the manifold insert 18. In this configuration, the second manifold portion 12 includes an integrated throttle body attachment 22 for mounting a throttle body component (not shown), and at least one cylinder head flange 24 for mounting the intake manifold assembly 10 to a cylinder head or other engine component (also not shown). Other attachments may also be included for other under-the-hood components, as discussed elsewhere herein. The first and second manifold portions 12, 14 are configured each with opposing mating surface 26 and 26' for joinder thereof. While a generally non-planer mating surface is shown, it is contemplated that the mating surfaces of the intake manifold assembly 10 may further include portions that are planar as well.

The intake manifold assembly 10 is preferably bonded together using an adhesive 16 capable of withstanding high temperatures without failure. However, more than one type of adhesive 16 (e.g., a plurality of different adhesives each at a different location) may be used which correspond to the localized temperature of the intake manifold assembly 10. For example, the adhesive used in a portion of the intake manifold assembly may be unique from adhesives used elsewhere for the intake manifold assembly 10 in that it has exceptional thermally resistant properties. The bonding of the first manifold portion 12 and the second manifold portion 14 results in a joint 28 having exceptional strength. In one embodiment, the strength of the joint 28 is optionally greater than, equal to, or less than the tensile strength of the material used for either of the first and second manifold portion 12, 14.

As previously discussed, the materials used for the first and second manifold portions 12, 14 are capable of withstanding high temperatures (e.g., for resisting thermal degradation, creep, or other deleterious thermal responses) associated with the operation of an engine. Advantageously, the materials of the first and second manifold portions 12, 14 may differ to better correspond to the temperature range that they may be exposed to. For example, typically cylinder heads and throttle bodies operate at a temperature far above ambient conditions. As such, it would be advantageous to design the second manifold portion 14, having the throttle body attachment 22 and cylinder head flange 24, which is capable of withstanding these higher temperatures. In contrast, the first manifold portion 12 typically is exposed to a lower temperature, because it is only indirectly in contact with the cylinder head and throttle body, and therefore may not require a material capable of withstanding high temperatures. As such, in this type of condition, it would be ideal to use two different materials to form an intake manifold assembly 10 because the first manifold portion 12 may comprise a lower cost material (e.g., having a lower melting point).

In a second example of the present invention, referring to FIG. 3, the throttle valve attachment 22 and the cylinder head flange 24 are shown as optionally separate components. In the second example, the throttle valve attachment 22 and the cylinder head flange 24 may be added to the intake manifold assembly 10 after or during the assembly of the other components using any of the mentioned techniques contained herein. As in the first example, this allows select portions or components of the intake manifold assembly 10 to comprise a material, which is capable of withstanding higher or lower temperature as desired. As such, it would be advantageous to use a material with a high melting point for the throttle body attachment and the cylinder head flange for the same reasons as previously stated. Likewise, it would be advantageous to use a lower cost material having a lower melting point for the other portions of the intake manifold assembly 10. Furthermore, as with the first example, one or more types of adhesives may also be used depending on the temperatures or structural requirements of the joint at a given region.

In the above examples, referring to both FIG. 2 and 3, the intake manifold is further configured with a manifold insert 18 for assisting in, or completely, defining an airflow path. Preferably, the manifold insert 18 is adhered or otherwise secured to a inner portion of the intake manifold assembly. As such it is foreseeable that the insert is bonded to the first manifold portion, the second manifold portion or both. However, it is contemplated that other types or configurations of inserts are used then what is shown. It is also contemplated that multiple inserts or no inserts are used.

The adhesive 16 preferably is provided over at least a portion of the surfaces to be joined, and preferably sufficiently about the periphery so that there are no appreciable gaps that result between the first and second manifold portions or components. In one embodiment, a bead of adhesive 16 is placed (e.g., by pumping, by laying a preformed strip, by extruding, by brushing, by spraying, by swabbing, by combinations thereof or otherwise) on at least one of the portions and another portion is brought into contact with it. The assembly is then cured. In another embodiment, the adhesive 16 may be pre-coated on one or both of the mating surfaces 26 of the respective manifold portions or components and then they are joined and cured. Any other suitable joining technique may likewise be employed. Preferably the amount of adhesive 16 employed is sufficient to achieve the desired performance characteristics of the assembly. Such amount will vary from application to application.

In preparation of the present assembly, the adhesive 16 is applied to one or more of the manifold portions or components by contacting the adhesive 16 in a suitable art-disclosed fashion, in either a continuous or intermittent bead or film, such that adhesive is disposed around the periphery or other portions of the mating surface 26 and the end of the adhesive bead or film connects with the beginning of the adhesive bead or film. The adhesive 16 can be applied immediately before joining the manifold portions or components or it can be applied in remote location (in time, location or both) relative to the location where the components are bonded together, or the engine.

If an adhesive (e.g., a cure-on-demand adhesive, a air cure adhesive, a combination thereof or the like) is employed, it is exposed to conditions such that it will cure and thereby bond the manifold portions or components together and form a seal between them. Such conditions can be applied prior to or after bringing components together for joining. It is well within the average level of skill in the art to determine which operation may be used to cure the adhesive 16 and when it should be performed. In one embodiment the operation may be an operation that is inherent in the assembly or operation of an automotive vehicle.

In any of the embodiment contained herein, and as illustrated in more particularity in the embodiments of FIGS. 4A-4D, optionally a space may be employed between the first and second manifold portion to form a gapped relationship. In general, this gapped relationship provides enhanced bonding capabilities by providing a first and second mating surface having an interposed continuous layer of adhesive, wherein the adhesive comprises an optimum thickness to best meet the strength requirements of the given application. Furthermore, the gapped relationship facilitates the bonding of one or more components to a base structure (e.g., a first or second manifold portion) by facilitating the prevention of adhesive from overflowing a first mating joint (e.g., a tongue and groove configuration or otherwise) such that the applied adhesive will be minimally exposed to other manifold portions, components or persons handling the intake manifold assembly.

Preferably, the gapped relationship is a predetermined distance existing between at least a portion of the first mating surface and the second mating surface. More so, preferably the gapped relationship further exists throughout the resulting joint created by the combining of the first and second manifold portions 12, 14. As such, it is contemplated that an adhesive layer resides in the gap created between the first and second matting surface. It is also contemplated that a continuous adhesive layer is created between the first and second manifold portions. It is further contemplated that an adhesive layer exists between the first and second manifold portions having a substantially continuous cross-sectional thickness therebetween.

Accordingly, in one preferred embodiment, the present invention further includes an alignment feature 30 to create the above-mentioned gapped relationship. In addition to the above advantages, the alignment feature 30 is configured to align manifold portions or components that may not have perfectly aligned mating surfaces. For example, the alignment feature 30 may be used to align a first linear mating surface with a second non-linear mating surface, wherein an adhesive is located therebetween. As such, the aligning of these mating surfaces results in a joint having substantially aligned mating surfaces and an adhesive layer with a substantially uniform cross sectional thickness.

Preferably, the alignment feature 30 is integrally formed with the first matting surface 26', the second matting surface 26 or both. Alternatively, the alignment feature 30 may be one or more independent spacers located between the first and second mating surfaces 26, 26'. As such, it is contemplated that the alignment feature may be adhesively bonded to the first matting surface 26', the second matting surface 26 or both.

Referring to FIGS. 4A-D, some of the above concepts are exemplified wherein an intake manifold assembly 10 is configured with a first and second manifold portion 12, 14 and are bonded together with an adhesive 16. In these examples, a gapped relationship results from the mating interaction between the alignment feature 30 and the first or second mating surfaces 26, 26'. Preferably, the adhesive layer between the first and second manifold portions 12, 14 have a substantially continuous cross-sectional thickness throughout the mating surfaces 26, 26', although variable and intermittent cross-sectional thickness may also be employed. More preferably, a generally fluid-tight seal is created throughout the resulting joint between the first and second manifold portions 12, 14.

As illustrated, the alignment feature may include one or more of a variety of opposing surface configurations (e.g., selected from a recess in a mating surface, a projection from a mating surface, an undulation, combinations thereof or otherwise), which may not be completely complementary so that when brought together they are aligned but spaced. By way of example, a projection and recess may be employed, each defined by walls of a different angle to other dimension so a space is obtained when the surfaces are brought together. Furthermore, the alignment feature preferably is integrally formed in at least one of the first or second manifold portions 12, 14 or mating recesses 26', 26 thereof. As such, it is contemplated that the alignment feature 30 may comprise a portion of mating surface and optionally be affixed to the other of first or second manifold portion 12, 14 with an adhesive 16. Furthermore, as shown in FIG. 4D, the alignment feature 30 may be located between manifold portions such as the plenum 32 region of the intake manifold assembly 10.

Figure 4C:
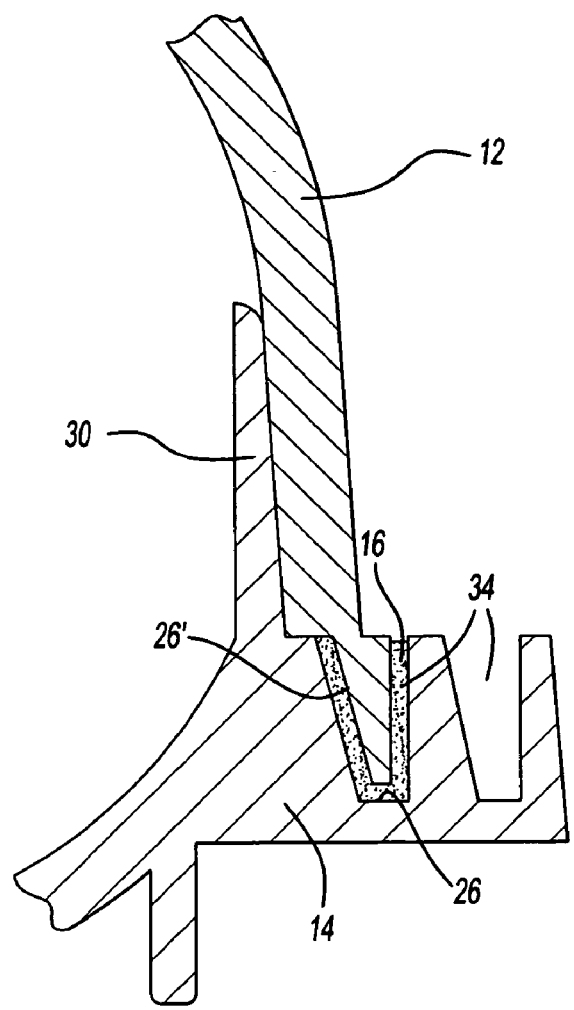
Figure 4D:
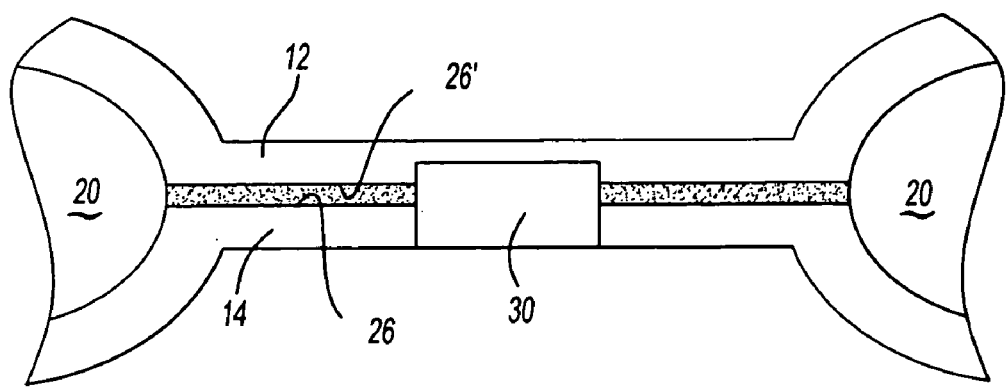

In more particularity with reference to FIGS. 4A-4D, alignment and spacing functions can be achieved, for example, by including a projection that is dimensioned so that a portion of it remains exposed when mated with an opposing recess, e.g., having a projecting alignment feature 30 with a width or diameter that is larger than the dimension of the opposing recess so that complete nesting is prevented and spacing between opposing surfaces 26, 26' of the portions 12 and 14 can be maintained, as in FIG. 4A.

As seen in FIG. 4B, another approach is to provide an alignment feature 30 comprising of an angled projection configured to engage a portion of an opposing first or second manifold portion 12, 14. As such, the alignment feature creates an outward force, of an opposition first or second manifold portion 12, 14 when the same are combined together. However, because of design considerations and an opposing force created by a mirrored joint of FIG. 4B attached thereto (not shown), the first manifold portion 12 is statically position and aligned over second manifold portion 14. As illustrated, this creates a gapped relationship between the first and second manifold portions 12, 14, wherein an adhesive 16 is interposed between the same.

Alternatively or in conjunction with, the first or second manifold portion 12, 14 may be configured with a projecting lip (not shown) to align the mating surfaces of the same. For example, a projection lip extending upward from an end portion of the second manifold portion would essentially trap the first mating surface between the projecting lip and the angled alignment feature 30 thereby creating a gapped relationship between the first and second manifold portion 12, 14. Optionally, the first and second mating surfaces 26, 26' may further consist of surfaces discontinuities 34 to increase the bonding surface area with the adhesive 16 or assist in the alignment of the same.

In FIG. 4C, another approach is illustrated, in which an alignment feature 30 (e.g., a projection or otherwise) is configured to abut a wall of the first manifold portion 12, with the first manifold portion 12 including a projection having a mating surface 26' that is offset relative to a wall defined in the mating surface 26, so as to provide a gap therebetween. As such, an increased mating surface 26, 26' is created having a substantially uniformed adhesive interposed therebetween.

In this example, it is contemplated that the mating surface 26 comprises one or more surface discontinuities 34 configured to receive the opposing projection (or otherwise) to create the above-mentioned gap. Furthermore, it is contemplated that one or more additional manifold portions may be mounted to the discontinuities 34 of mating surface 26 using any of the techniques disclosed herein. As such, it is contemplated that the wall of the first manifold portion 12 (or alternate component) may also act as an alignment feature for another manifold portion.

Therefore, the first manifold portion 12 may be interposed between the second manifold portion 14 and an additional portion (e.g., third manifold portion, or otherwise) (not shown). More advantageously, it is contemplated that the first manifold portion 12 is replaced by an insert 18, wherein the insert and an additional manifold portion (albeit an enlarged version of the first manifold portion 12) is matingly attached to mating surface 26, preferably through adhesive bonding with one or more surface discontinuities 34. As such, an intake manifold assembly 10 may be created having a first manifold portion 12, a second manifold portion 14, and an interposed insert (being aligned by alignment feature 30), wherein the first manifold portion 12 and the interposed insert are adhesively bonded to the second manifold portion 14 with an adhesive having a substantially uniformed cross sectional thickness.

In yet another example, referring to FIG. 4D, another alignment feature 30 is illustrated for aligning and creating a spaced relationship between the first and second mating surfaces 26, 26'. In this example, the alignment feature 30 is located in the plenum region 32 of the first or second manifold portion 12, 14 and preferably between runners 20.

It will be appreciated from a review of FIGS. 4A-4D that any of a variety of modifications to the structures can be made but still be within the present invention. For example, a gap may be maintained on more than one side of a projection, so that adhesive is applied to plural sides. A gap may be maintained in only a single side. A bead projection might be included on one or more surfaces for spacing, or to provide a stop for helping to seal the joint from the escape of excess adhesive. A metal, plastic or ceramic bead (e.g., a glass bead) may be inserted in the gap. Other variations are also possible.

Furthermore, it will be appreciated that any of the features shown in FIGS. 4A-4D can be combined into a single mating surface. Alternatively, or in combination, any of the alignment features previously described, or their equivalents, or otherwise, may be located anywhere proximate to the first and second mating surfaces 26, 26', including internally or externally located.

The above gapped relationship and alignment features 30 of the present invention are used in conjunction with any of the combined first and second mating surfaces 26', 26. However, it is further contemplated that the gapped relationship and/or the alignment feature 30 is use in any adhesively bonded portion of the intake manifold assembly 10 (e.g., between the intake manifold assembly and the throttle body attachment 22, cylinder head flange 24 or otherwise).

In a preferred embodiment of the present invention, either or both of the first or second manifold portions 12, 14 is fabricated from a plastic material, i.e., a thermoset material, a thermoplastic material, or a mixture thereof. Among preferred high-performance thermoplastic materials are polybutylene terephthalate, polyetherimides, polyphenylene ether/polyamide resins, polyether sulfone resins, polyether ether ketone resins, liquid crystal polymers, polyarylsulfone resins, polyamideimide resins, polyphthalimide resins, nylon 6, 6, nylon 6 other polyamide resins, syndiotactic polystyrene, and blends thereof. In a particular preferred emebodiment, the material is a thermoplastic selected from polyamides, polystyrenes, polyolefins, polycarbonates, or mixtures thereof. More preferably, the material is optionally glass-filled and is selected from polyamides (e.g., nylon 6 or nylon 6,6), polystyrenes, a blend of polyamides and syndiotactic polystyrenes, polypropylene, or mixtures thereof. In one preferred embodiment, the material is a blend of polyamides and syndiotactic polystyrenes, and more preferably a blend of nylon 6,6 and syndiotactic polystyrene. Among useful thermoset materials are epoxy resins.

As can be gleaned from the above discussion, any of the materials identified above may be used for one portion, with a different material used for another portion. Without limitation, examples of combinations of materials that may be suitable are those selected from polyamide, polyolefin, polystyrene, polysulfone, and blends thereof for use as one component; and those selected from polyamide, polyolefin, polystyrene, polysulfone, and blends thereof for use as another component. In a particularly preferred embodiment, the material for one component is different from the material of at least one other component.

Any of the materials that are employed in the manifold portion, components or otherwise of the present invention may optionally employ a filler or reinforcement material such as, without limitation, a long fiber reinforcement (e.g., an average length greater than or equal to 2 mm), a short fiber reinforcement (e.g., less than 2 mm) or a combination thereof (e.g., about 10 to 90 parts by weight of a long fiber reinforcement and about 90 to about 10 parts by weight of a short fiber reinforcement, such as about 20 to 50 parts by weight of a long fiber reinforcement and about 50 to 20 parts by weight of short fiber reinforcement. Examples of fiber reinforcement materials include without limitation, glass fiber, aramid fiber, carbon fiber, combinations thereof or the like. Other suitable filler materials may be employed, such as powders or other particulates of talc, calcium carbonate, mica, silica, other suitable ceramics or minerals, combinations thereof or the like. Any suitable amount may be employed for any filler or reinforcement. For instance, in one embodiment, one or a plurality of the components is a plastic that includes an amount of about 10 to about 50 volume percent and more preferably about 35 volume percent of a filler or reinforcement.

The plastics used for preparing the manifold portions or components typically could also include other ingredients, such as property modifiers (e.g., impact modifiers, flame retardants, UV protectants or the like). Preferably, the material selected exhibits a tensile strength of at least about 50 MPa, more preferably at least about 78 MPa and possibly up to 175 MPa, 225 MPa or greater and an elongation of about 1 to about 10%, and more preferably about 3 to about 5%. Of course, the materials are not required to exhibit these properties or capabilities unless otherwise specifically stated.

Of course, one or more of the manifold portions or components might be a metal (e.g., cast iron, steel, magnesium, aluminum, titanium or the like), a composite, a ceramic (e.g., a carbide, a nitride, a boronitride, or the like), or some other material. Plastic manifold portions or components are preferably injection molded using conventional techniques and processing conditions. Alternatively, they may be prepared in another suitable manner, such as by rotational molding, compression molding, thermoforming, blow molding or the like. Components or manifold portions other than those made of metal may be prepared using any of a number of art-disclosed techniques, such as, without limitation, casting, forging, milling, sintering (or other near net shape formation process), stamping, combinations thereof or the like.

One or more of the manifold or component materials or the adhesive may be suitably treated (uniformly or locally) as desired to improve corrosion resistance, oxidation resistance, thermal resistance, or another characteristic of the final product. For instance, they might be admixed, impregnated or coated with an organic coating (e.g., a water-based organic coating), an inorganic coating or combination thereof, or with other suitable additives for achieving a desired property. Any suitable application technique may be employed, such as (without limitation) plasma deposition, physical vapor deposition, chemical vapor deposition, spraying, brushing, dipping, swabbing, combinations thereof, or the like.

In some instances, bond strengths might be enhanced by further contacting the adhesive with a suitable primer, such as without limitation a water based primer. Other surface treatments may also be used to increase bond strength such as scuffing or sanding components surfaces or using other surface treatments discussed herein or elsewhere.

The adhesive 16 of the present invention is a structural adhesive and more preferably is a curable on demand material. Any adhesive 16 that after cure can withstand the conditions of use of an engine (e.g., for an automotive vehicle) can be used. Preferably such adhesive does not decompose or delaminate at temperatures of up to about 138° C. (280° F.), more preferably up to about 143° C. (290° F.), even more preferably up to about 160° C. (320° F.) and most preferably up to about 191° C. (375° F.).

Furthermore, the adhesive 16 is able to withstand exposure to hydrocarbon materials, calcium chloride, brake fluid, glycol coolants, windshield washer solvents and the like, at the above-mentioned temperatures and the pressures to which the internal combustion engine reaches internally. In an optional embodiment, the adhesive 16 is able to bond to other engine components, which may be metallic, ceramic, composite, plastic, or the like. The adhesive 16 used may be curable via a variety of known mechanisms including, but not limited to, heat cure, infrared cure, ultraviolet cure, chemical cure, radio frequency cure, solvent loss, air cure, moisture cure, combinations thereof or the like.

In another embodiment the adhesive 16, which may be a cure-on-demandmadhesive, requires a separate operation to cause the adhesive 16 to begin to cure. In one embodiment this is achieved by using an encapsulated ingredient, such as a curing agent, which is ruptured during assembly. In another embodiment this is achieved by removing a protective coating to expose the adhesive 16 to ambient conditions. Cure can be initiated by exposing the adhesive 16 to heat, an infrared light source, an ultraviolet light source, a radio frequency signal, a chemical agent, moisture, to a shearing force, a combination thereof, or otherwise.

While other adhesive families are contemplated as well (e.g., urethanes, acrylics, cyanoacrylates, an elastomer, a silicon containing system (e.g., silicone or silane), another suitable cross-linkable material, a hot melt having a melting point greater than the typical operating temperature of the bonded manifold portions, components, or the like), preferably the adhesive is a high temperature epoxy resin, a polyimde, a hi-bred polyimide/epoxy resin adhesive or an epoxy novolac/nitrile rubber adhesive. Preferred adhesives are the high temperature epoxy resin adhesives. High temperature epoxy resin adhesive means an adhesive wherein the primary component is an epoxy resin which when cured can withstand exposure to the temperatures mentioned above without decomposing or delaminating from the substrate.

In one embodiment, the adhesive 16 is a mineral filled catalyzed adhesive that includes one or more regular or modified epoxy components, a suitable curing agent and a suitable thixotropic agent for maintaining a room temperature Brookfield viscosity (in uncured state) on the order of about 500 cps.

In another particularly preferred embodiment, the adhesive 16 is a single or multi-component (e.g. a two component) adhesive, such as an epoxy adhesive.

In yet another embodiment, the adhesive is a urethane based adhesive. Alternatively, the adhesive may include a functional component selected from acrylonitrile butadiene styrene (ABS), polycarbonate (PC), or a mixture thereof (e.g. PC-ABS). In a further alternative embodiment the adhesive is a silane adhesive, a silicon adhesive or a mixture thereof. In yet another embodiment, the adhesive is an acrylic adhesive. The adhesive may also be epoxy based. It may include polyolefinics, styrenics, acrylics or mixtures thereof. In yet another embodiment, a preferred adhesive includes alkyl borane. Examples of suitable adhesives are disclosed in commonly owned U.S. Pat. No. 09/466,321 (filed Dec. 17, 1999) and patent publication numbers 20020058764 and 20030001410 expressly incorporated herein by reference for all purposes. Any such adhesive may include suitable performance modifiers including art disclosed tackifiers, elastomers, impact modifiers, or the like.

In one embodiment, a two part, organoborane/amine complex adhesive or other adhesive is employed for adhesively securing combinations of the frames, the reinforcement structures or both together. Advantageously, such an adhesive can adhere to low surface energy surfaces or substrates. As such, the adhesive is preferably capable of bonding to corresponding surfaces having a surface energy of less than 45 mJ/m$^2$.

Adhesives, polymerizable compositions and method of used disclosed in International Patent Application No. PCT/US00/33806, incorporated herein by reference, are especially preferred for use in the present invention.

It should be recognized that the use of the term adhesive herein is not intended to foreclose primers or other bonding agents from the scope of the present invention.

The present invention offers considerable design flexibility. Though mating surfaces can be planar, they need not be. In a preferred embodiment, either or both of the mating surfaces is generally non planar (e.g., contoured, stepped, corrugated, or the like). The employment of molded plastic components also enables the formation of intricately shaped structures. In this regard, the intake manifold can have molded or otherwise fabricated in or on one of its surfaces one or more components such as brackets, connectors, cable guides, hose guides, harnesses, clips or the like. Further, conduits, ports or other like passages can be cored or machined into a molded component to enable integration of multiple components into the intake manifold assembly 10.

As will be appreciated by the skilled artisan, among the many advantages of the present invention are that assemblies can be made that are substantially free of a sealing gasket, mechanical fasteners or both. However, the scope of the present invention does not foreclose the use of gaskets or fasteners. Indeed, it is contemplated that a gasket might be made from (e.g., by die cutting a gasket) the adhesive or incorporate as a component thereof (e.g. as an impregnant or coating), the adhesive of the present invention. Thus, for certain preferred embodiments, the resulting structure seals much like a gasket would, but also exhibits the desirable mechanical characteristics of a structural adhesive.

It is possible that the adhesive 16 and combinations of the present invention may be employed in a system that further employs a joint that is formed by vibration welding, though advantageously certain preferred embodiments are devoid of a vibration weld.

In another embodiment the intake manifold assembly may include an integrated acoustic management system designed to prevent the noise inherent in the operation of an internal combustion engine from escaping the engine compartment. In one embodiment the assembly may include an outer shell and an inner shell adapted such that the inner shall is located within the outer shell and there is a gap between the two. The gap may simply contain air which can attenuate certain sound waves thereby reducing the noise that can be heard outside the engine. Alternatively the gap can be filled with a sound deadening material such as elastomeric material or foam material. In another embodiment the valve cover may have bound to its inner surface a sound attenuating material such as the elastomer or foam.

In another embodiment the assembly of the invention can include a coating or film on the exterior or interior which functions to improve the barrier properties of the intake manifold to hydrocarbons. Such a coating of film can reduce the fugitive hydrocarbon emission from an automotive vehicle. Any coating or film which prevents the transmission of hydrocarbons through the assembly may be used. A preferred coating is a carbon-silica based plasma deposited coating as described in U.S. Pat. No. 5,298,587; U.S. Pat. No. 5,320,875; U.S. Pat. No. 5,433,786 and U.S. Pat. No. 5,494,712 incorporated herein by reference.

In one embodiment, the assembly of the present invention may be capable of withstanding a temperature of about 163° C. (about 325° F.) for at least about 2500, and more preferably about 3000 hours and about 177° C. (about 350° F.) for at least about 75 and more preferably about 100 hours. The assembly exhibits little or substantially no detectable degradation in the presence of automotive vehicle fluids, such as brake fluid, windshield washer fluid, power steering fluid, engine coolant (standard and lifetime), engine oil (standard, synthetic and sour), gasoline, diesel fuel, ethanol, methanol, starter fluids or the like. The assembly also exhibits little or no detectable degradation due to exposure to environmentally encountered compounds such as calcium chloride, sodium chloride, exhaust gas (egr type) or the like. In a particularly preferred embodiment, the resulting tensile strength of the adhesive of the joint in the assembly is at least about 4000 psi (28 MPa), more preferably at least about 6500 psi (45 MPa), and still more preferably at least about 9000 psi (62 MPa). Further preferably the strength of the joint is greater than the strength of at least one, and preferably more than one, of the individual molded components. Of course, the assembly, the component thereof and the adhesive are not required to exhibit these properties unless specifically stated.

The present intake manifold assembly can be employed in combination with other adhesively bonded engine components, such as an adhesively bonded valve cover cylinder head assembly, an adhesively bonded water (or other fluid) conductor, an adhesively bonded oil pan, or otherwise.

Though the present invention has been described in the context of automotive vehicle engine intake manifolds, the use of the invention is not intended to be limited thereby. Any motorized object employing an intake manifold subject to operating conditions milder than or comparable to those experienced by an automotive vehicle engine may employ the present technology.

The present invention also contemplates the employment of a removal and repair or replacement step that is performed upon the resulting assemblies of the present invention. Accordingly, it is contemplated that the teachings of U.S. Provisional Application Ser. Nos. 60/390,305 and 60/432,620 (both of which are hereby incorporated by reference) may be employed. It is also contemplated that the invention herein will include a step of re-claiming and recycling materials from the assembly in post-consumer operations.

To the extent not already covered by the description above, the present invention also contemplates as within its scope the combinations that are recited in the claims as set forth in the following (i.e., the provisional patent application claims filed in the provisional application).

What is claimed is:

1. A method for making an automotive vehicle intake manifold comprising the steps of:
   providing a first portion of an intake manifold for defining an air path, the first portion being free of at least one of a throttle body attachment, or a cylinder head flange;
   joining the first portion to a throttle body assembly; and
   joining the first portion to an engine cylinder head;
   wherein the joining of the first portion to the throttle body assembly, the engine cylinder head or both is done with a structural adhesive having a tensile strength of at least 28 MPa; and
   wherein the structural adhesive directly joins the first portion to the throttle body assembly, the engine cylinder head or both.

2. The method of claim 1, wherein the first portion includes a first shell portion that is plastic bonded to a second shell portion.

3. The method of claim 2, wherein the shell portions are formed of dissimilar materials.

4. The method of claims 3, wherein the first or second shell portion includes one or more EGR valve attachments, cross-over pipe attachments, housing for active manifold actuators, blow-by valve attachments, valve cover attachments, bracket attachments, attachment nipples, air filter housing, air ducts, pressure sensors, mass air flow sensors, resonators, fuel rails or a combination thereof.

5. The method of claim 3, wherein the cylinder head flange is connected to the first or second shell portion using an adhesive.

6. The method of claim 4, wherein the throttle body attachment is connected to the first or second shell portion using an adhesive.

7. The method of claim 1, further comprising a manifold insert located between the first and second portions.

8. A method for making an intake manifold for an automotive vehicle, comprising the steps of:
   providing a first shell portion of an intake manifold being made of a first material; and
   adhesively joining the first shell portion to a second shell portion of the intake manifold being made of a second material that is different from the first material, wherein the first shell portion and the second shell portion combine to form runners for air flow within the intake manifold.

9. The method of claim 8, further comprising the step of placing an insert between the first and second shell portions.

10. The method of claim 8, wherein the first shell portion, the second portion or both portion comprises a plastic.

11. The method of claim 8, wherein the first or second shell portion further includes a cylinder head flange adhered thereto.

12. The method of claim 8, wherein the first or second shell portion further includes a throttle body attachment adhered thereto.

13. The method of claim 8, wherein the first or second or both shell portions comprise a reinforced fiber.

14. The method of claim 11, further comprising the step of attaching the intake manifold to a automotive engine, cylinder head or otherwise through the cylinder head flange using adhesives, fasteners or both.

15. The method of claim 8, wherein the first or second shell portions further comprise of a throttle body attachment and a cylinder head flange for attachment of the same and wherein the intake manifold assembly further comprises an insert spaced between the first and second shell portions.

16. A method for making an automotive vehicle intake manifold assembly, comprising the steps of:
   providing a first manifold portion made of a first material;
   providing a second manifold portion made of a second material, the second material being different than the first material;
   adhesively joining, with structural adhesive, the first manifold portion to the second manifold portion to define an intake manifold for an automotive vehicle
   adhesively joining, with structural adhesive, a component selected from a cylinder head, a cylinder head flange, a throttle body or a throttle body attachment directly to the intake manifold.

17. The method of claim 16 wherein:
   the first portion has an associated first mating surface;
   the second portion has an associated second mating surface; and
   an alignment feature is integrally formed with the first or second portion and aligns and maintains a gapped relationship between the first and second mating surfaces.

18. The method of claim 17, wherein the mating surfaces of the first and second portions are generally nonplanar.

19. The method of claim 17, wherein the mating surfaces of the first and second portion comprise at least one tongue and groove relationship.

20. The method of claim 17, wherein the alignment feature includes a projecting portion of the first mating surface or second mating surface.

21. The method of claim 17, wherein the alignment feature includes a recessed portion of the first mating surface or second mating surface.

22. The method of claim 17, further comprising a mechanical attachment for joining the first and second portions.

23. The method of claim 17, wherein said joint is substantially free of mechanical fasteners.

24. The intake manifold assembly of claim 17, wherein the alignment feature is configured of a recessed portion having a width or diameter that is smaller than the dimension of an opposing angled projection thereby preventing completed nestling of the first and second mating surface such that the gapped relationship is formed.

25. The method of claim 17, wherein the alignment feature is configured of a pair of opposing angled projections extending from the second component thereby preventing the complete nestling of the first and second mating surfaces such that the gapped relationship is formed.

26. The method of claim 17, wherein the alignment feature is configured of a projection extending from the second component and located between runners of an intake manifold assembly such that complete nestling of the first and second mating surfaces are prevented such that the gapped relationship is formed.

27. The method of claim 17, wherein the first or second portions includes a resin selected from nylon 6, nylon 6,6, polypropylene, polyethylene, polybutylene, terephthalate, polyetherimide, polyphenylene, ether/polyamide, polyethere sulfone, polyethe ether ketone, polyanylsulfone, polyamideimide, polyphthamlimide, polycarbonate, acrylonitrite butadiene styrene, polyamide, syndiotactic polystyrene, and blends thereof.

28. The method of claim 17, wherein the first or second portions include a resin having a filler or reinforcement selected from glass, mineral, carbon fiber, graphite, aramide, clay talc, calcium carbonate.

29. The method of claim 28, wherein the filler or reinforcement is glass and is selected from a long fiber glass, a short fiber glass or a combination thereof.

30. The method of claim 17, wherein the adhesive is selected from urethanes, epoxies, silicones, silanes, polyimides, organoborates, acrylics, acetates, or combinations thereof.

31. The method of claim 30, wherein the adhesive includes a filler.

32. The method of claim 30, wherein the adhesive is a cure on demand adhesive.

33. The method of claim 30, further comprising applying a surface treatment on the first, second or both portions and in contact with the adhesive.

34. The method of claim 30, wherein a gap is defined between the first portion and the second portion, within the first portion, within the second portion, or a combination thereof.

35. The method of claim 34, further comprising filling the gap with a material for improving the NVH characteristics of the intake manifold.

36. The intake manifold assembly of claim 35, wherein the material is an elastomer, a foam or a combination thereof.

37. The method of claim 3 wherein the adhesive has a tensile strength of at least 45 MPa.

38. The method of claim 8 wherein the first shell portion is adhesively secured to the second shell portion with a structural adhesive.

39. The method of claim 38 wherein the structural adhesive has a tensile strength of at least 28 MPa.

40. The method of claim 38 wherein the first material or the second material is a polyolefin.

41. The method of claim 38 wherein the first material or the second material is a metal.

42. The method of claim 38 wherein:
  i. wherein the structural adhesive has a tensile strength of at least 28 MPa;
  ii. the first material or the second material is a polyolefin; and
  iii. the first material or the second material is a metal.

43. The method of claim 16 wherein the structural adhesive joining the first manifold portion and the second manifold portion has a tensile strength of at least 28 MPa.

44. The method of claim 16 wherein the first material or the second material is a polyolefin.

45. The method of claim 44 wherein the first material or the second material is a metal.

46. The method of claim 16 wherein the component is formed of a third material that is different from both the first material and the second material.

47. The method of claim 8 and wherein:
  i. the first portion provides a mating surface formed of the first material and the second portion provides a mating surface formed of the second material;
  ii. adhesively joining the first shell portion the second shell portion includes joining the mating surface of the first portion to the mating surface of the second portion with a structural adhesive; and
  iii. the mating surface of the first portion, the mating surface of the second portion, which is joined by the structural adhesive, is a low energy surface having a surface energy of less than 45 mJ/m$^2$.

48. The method of claim 16 and wherein:
  i. the first portion provides a mating surface formed of the first material and the second portion provides a mating surface formed of the second material;
  ii. adhesively joining the first shell portion the second shell portion includes joining the mating surface of the first portion to the mating surface of the second portion with a structural adhesive; and
  iii. the mating surface of the first portion, the mating surface of the second portion, which is joined by the structural adhesive, is a low energy surface having a surface energy of less than 45 mJ/m$^2$.

* * * * *